United States Patent [19]

Maki et al.

[11] Patent Number: 4,968,118
[45] Date of Patent: Nov. 6, 1990

[54] STRAIGHT GUIDE DRIVING DEVICE

[75] Inventors: Takao Maki, Tachikawa; Tetsuya Hashimoto, Hachiouji, both of Japan

[73] Assignee: Olympus Optical Co., Ltd., Tokyo, Japan

[21] Appl. No.: 254,606

[22] Filed: Oct. 7, 1988

[30] Foreign Application Priority Data

Oct. 9, 1987 [JP] Japan .................................. 62-255616

[51] Int. Cl.$^5$ ...................... G02B 27/00; G02B 21/24
[52] U.S. Cl. ................................... 350/321; 350/521; 350/530; 74/422
[58] Field of Search ............... 350/321, 518, 521, 522, 350/528, 529, 530, 531; 74/422, 434, 457

[56] References Cited

U.S. PATENT DOCUMENTS 2,489,487  11/1949  Gradisar et al. ..................... 350/521
3,826,559   7/1974  Berliner et al. ..................... 350/530
4,445,758   5/1984  Emmel ................................. 350/530

Primary Examiner—Bruce Y. Arnold
Assistant Examiner—Loha Ben
Attorney, Agent, or Firm—Cushman, Darby & Cushman

[57] ABSTRACT

The straight guide driving device comprises a guide rail fixedly attached to an immovable block such as the microscope body, a movable block such as a microscope tube block mounted so as to be displaced along the guide rail and a rack-pinion connection interposed between the immovable block and the movable block for driving the movable block. The rack-pinion connection has a pair of rack members which are fixedly attached to the movable block and arranged respectively in the vicinity of both the opposite sides of the guide rail. Accordingly, the movable block can perform straight movement with very high accuracy along the guide rail.

2 Claims, 2 Drawing Sheets

STRAIGHT GUIDE DRIVING DEVICE

BACKGROUND OF THE INVENTION (a) Field of the invention:

The present invention relates to a straight guide driving device and, more specifically to a straight guide driving device suited for use to guide the vertical movement of the tube of a measuring microscope or the similar instrument.

(b) Description of the prior art:

The straight guide driving device used for vertical movement of the tube of a measuring microscope is generally disposed on an immovable member such as the body of a measuring microscope, and is equipped with a guide means for guiding a movable member such as the tube support, a driving shaft pivoted on the immovable member and having a pinion, and a rack fixed to the immovable member and engaged with the pinion. However, the pinion and rack are conventionally disposed on one side of the guide means, thereby posing a problem that accuracy of the vertical movement of the movable member is not maintained, i.e., measuring error is caused due to deviation of the center axis of the tube since turning moment is produced when the rack is driven by the rack and the direction of the turning moment is opposite between the ascending motion and descending motion. Further, when a measuring microscope is equipped with an optical rangefinder, the low accuracy of the vertical movement of the movable member is very serious since it is required to reserve a very narrow spacing between a scale attached to the immovable member and an index attached to the movable member.

SUMMARY OF THE INVENTION

A primary object of the present invention is to provide a straight guide driving device so adapted as to maintain high accuracy of the vertical movement of the movable member.

The straight guide driving device according to the present invention is equipped with a guide means arranged on the immovable member for guiding the movable memer, and a pair of driving force transmitting members interposed between the immovable member and the movable member and arranged on both the sides of the guide means respectively. Accordingly, the turning moments produced on the respective driving force transmitting members are cencelled with each other, thereby maintaining high accuracy for straight motion of the movable member.

This and other objects as well as the features and the advantages of the present invention will become apparent from the following detailed description of the preferred embodiment when taken in conjunction with the accompanying drawings.

DESCRIPTION OF THE PREFERRED EMBODIMENT

Now, the present invention will be detailedly described with reference to the accompanying drawings illustrating an embodiment thereof.

Figure 1:
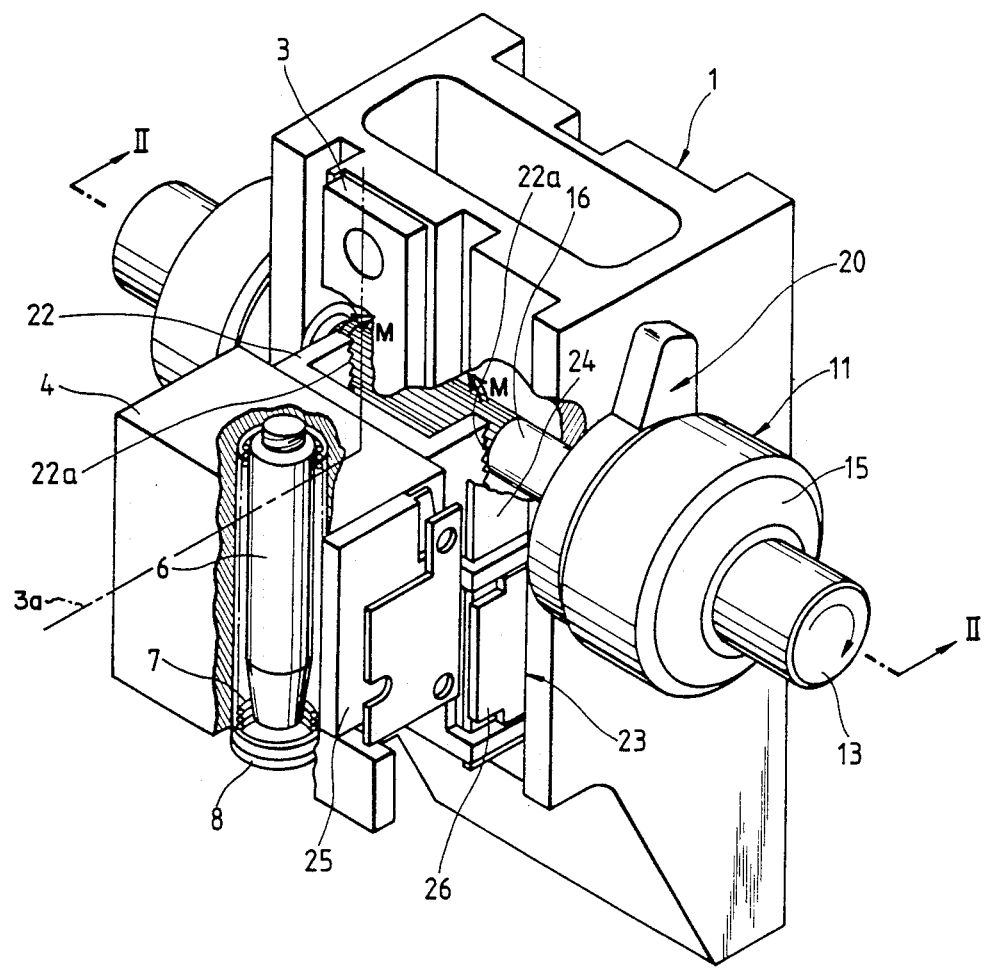
FIG. 1 is a perspective view illustrating an embodiment of the present invention wherein the straight guide driving device according to the present invention is assembled in a focusing device of a measuring microscope.
Figure 2:
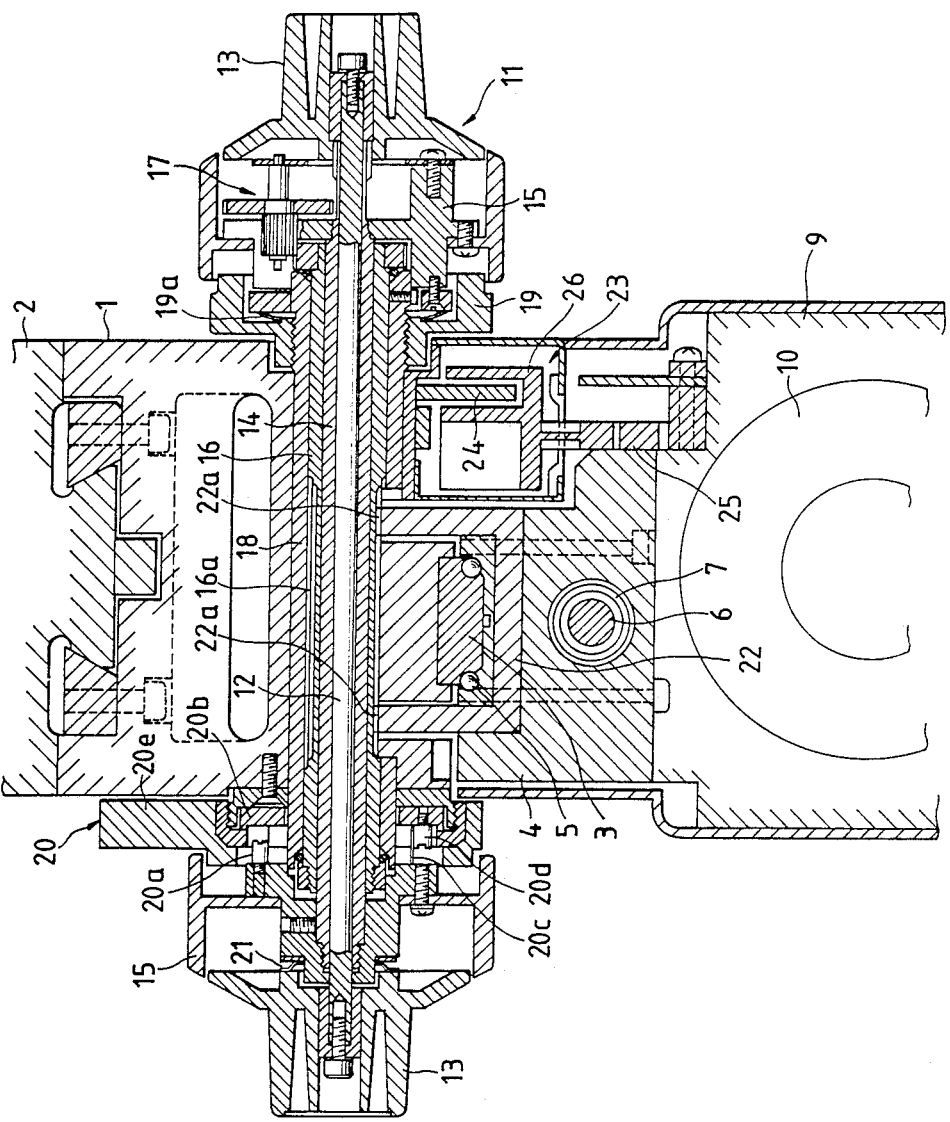
FIG. 2 is a sectional view taken along the II—II line in FIG. 1.

In FIG. 1 and FIG. 2, the reference numeral 1 represents a focusing device block fixed to the microscope body 2, the reference numeral 3 designates a perpendicular guide rail which is fixedly attached to the focusing device block 1 and the reference numeral 4 denotes a tube supporting block which is guided in the perpendicular direction by the guide rail 3 and prevented from coming out toward the microscopist (downward in FIG. 2) by a plural number of balls arranged between the tube supporting block and the guide rail 3. Reference numeral 6 represents a guide shaft attached to the inside of the tube supporting block 4 and the reference numeral 7 designates a coil spring which is fitted around the guide shaft 6, and interposed between the ceiling of the tube supporting block 4 and a supporting arm 8 fixedly attached to the focusing device block 1 so as to urge the tube supporting block 4 upward for lessening the weight of a tube 10. Reference numeral 9 denotes a tube holding plate which is fixed to the tube supporting block 4 for holding the tube 10. The reference numeral 11 represents a coarse/fine adjustment coaxial handle disposed in such a manner as to run through the focusing device block 1 in the horizontal direction, the reference numeral 12 designates a fine adjustment shaft to which fine adjustment handles 13 are fixedly attached and the reference numeral 14 denotes a tubular coarse adjustment shaft which is fitted rotatably around the fine adjustment shaft 12 and equipped with coarse adjustment handles 15 fixedly attached to both the ends thereof. Reference numeral 16 represents a tubular driving shaft which is rotatably fitted over the coarse adjustment shaft 14 and has a pinion 16a formed at the center thereof and the reference numeral 17 designates a reduction gear mechanism which has intermediate gears, etc. pivotally engaged with the coarse adjustment handle 15 and is interposed between the fine adjustment handle 13 and the driving shaft 16. Reference numeral 18 denotes a handle tube which is fitted over the driving shaft 16 so as to rotatably support the driving shaft 16, fixed to the focusing device block 1 and has a cut-off portion at the central front side thereof (the central lower side in FIG. 2). Reference numeral 19 represents a frictional resistance imparting handle which is screwed over the handle tube 18 and functions to impart frictional resistance to the coarse adjustment handle 15 with an elastic pressing member 19a interposed between the coarse adjustment handle 15 and the frictional resistance imparting handle 19, and so designed so as to be rotated for adjusting frictional resistance. Reference numeral 20 designates a lock handle so adapted as to stop the coarse adjustment handle 15 always at an optional position when the coarse adjustment handle 15 is turned in the reverse direction and then in the normal direction with a handle 20e tightened at an optional position to lock a ring 20b though the ring 20b is normally rotated as the coarse adjustment handle 15 is rotated since a pin 20a fixedly attached to the coarse adjustment handle 15 is connected to the ring 20b loosely fitted over the handle tube 18 and is in contact with a pin 20d connected to the pin 20a through a coil spring 20c. Reference numeral 21 denotes an elastic pressing member which is interposed between the fine adjustment handle 13 and the coarse adjustment handle 15, and is so designed as to impart an adequate degree of frictional resistance between both the handles. In addition, the lock handle 20 is positioned reversely between FIG. 1 and FIG. 2 for convenience of tracing. When the fine adjustment handle 13 is rotated, the driving shaft 16 is rotated at a reduced speed by way of the reduction gear mechanism 17. When the coarse adjustment handle 15 is rotated, the driving shaft 16 is rotated in the directly coupled condition without functioning the reduction gear mechanism 17 and, when the lock handle 20 is further tightened at an adequate position, the rotation of the coarse adjustment handle 15 is restricted at that position. The reference numeral 22 represents a rack member fixed to the tube supporting block 4 and having a pair of racks 22a which are located on the right and left sides respectively of the guide rail 3 and engaged with the pinion 16a of the driving shaft 16. The reference numeral 23 designates an optical rangefinder which consists of a scale 24 fixed to the focusing device block 1, a head 25 fixed to the tube supporting block 4, and an index 26 supported on the head 25 and arranged in the vicinity of the scale 24 with a narrow space reserved therefrom, said optical rangefinder being used for detecting displacement distance of the tube supporting block 4, i.e., displacement distance of the tube 10.

In the embodiment having the formation described above, when the rack member 22 is driven upward with the pinion 16a of the driving shaft 16 by turning either the coarse adjustment handle 15 or the fine adjustment handle 13 of the coarse/fine adjustment coaxial handle 11, for example, in the clockwise direction (the direction indicated by the arrow in FIG. 1), turning moments are produced in the right and left racks 22a and 22a respectively around the center axis 3a of the guide rail 3 in the directions indicated by the arrows M and M respectively in FIG. 1, but these turning moments are in the directions opposite to each other and cancelled with each other. When the coarse adjustment handle 15 or the fine adjustment handle 13 is turned in the counterclockwise direction (the direction opposite to that indicated by the arrow in FIG. 1), turning moments are produced in the right and left racks 22a and 22a in the directions opposite to those indicated by the reference symbols M and M respectively and cancelled with each other in the similar manner. Accordingly, the tube supporting block 4 is not deviated in the horizontal direction during its vertical movement and can maintain high accuracy for its straight motion, thereby eliminating the fear of measuring errors to be produced due to deviation of the center axis of the tube 10. Further, since high accuracy is maintained for the vertical movement of the tube supporting block 4, the space between the optical rangefinder 23 and the index 26 is maintained with high accuracy so as to improve measuring accuracy. Furthermore, the load produced by the microscope tube which has conventionally been supported by a single rack is shared between a pair of racks 22a and 22a, thereby producing an effect to reduce wearing of the racks 22a.

Moreover, the straight guide driving device according to the present invention can be designed as a horizontal driving type unlike the embodiment described above. In addition, the straight guide driving device according to the present invention can be equipped, as the driving means, with two right and left ball screws running through and screwed in the movable member which are to be turned synchronously for driving.

What is claimed is:

1. A straight guide driving device comprising guide means fixedly attached to a stationary member, a movable block mounted so as to be guided by said guide means, and driving force transmitting means arranged between said stationary member and said movable block to move said movable block, said driving force transmitting means comprising a driving shaft having a pinion formed thereon and a rack member secured to said movable block and having two racks located respectively in the vicinity of opposite sides of said guide means, said two racks being engaged with said pinion.

2. A straight guide driving device according to claim 1 further comprising an optical rangefinder consisting of a head fixed to said movable block, an index supported on said head, and a scale attached to said immovable member and cooperating with said index, to detect displacement distance of said movable block.

* * * * *